United States Patent [19]

McComas

[11] 4,128,839
[45] Dec. 5, 1978

[54] MEANS FOR ACCUMULATING AIRCRAFT POSITION DATA FOR A BEACON BASED COLLISION AVOIDANCE SYSTEM AND OTHER PURPOSES

[75] Inventor: Arthur D. McComas, Baltimore County, Md.

[73] Assignee: The Bendix Corporation, Southfield, Mich.

[21] Appl. No.: 810,701

[22] Filed: Jun. 28, 1977

[51] Int. Cl.² ............................................. G01S 9/56
[52] U.S. Cl. ........................... 343/112 CA; 343/6.5 R; 343/112 TC
[58] Field of Search ................. 343/112 TC, 112 CA, 343/6 R, 6.5 R, 6.5 LC; 235/150.23

[56] References Cited

U.S. PATENT DOCUMENTS

| 2,891,246 | 6/1959 | Reed, Jr. | 343/6.5 R |
| 3,792,472 | 2/1974 | Payne et al. | 343/6.5 LC |
| 3,808,598 | 4/1974 | Carter | 343/112 TC |
| 3,959,793 | 5/1976 | Litchford | 343/112 CA |

Primary Examiner—Maynard R. Wilbur
Assistant Examiner—Lawrence Goodwin
Attorney, Agent, or Firm—W. G. Christoforo; Bruce L. Lamb

[57] ABSTRACT

A protected aircraft having a discrete address beacon transponder includes a ground base air traffic control radar beacon system (ATCRBS) interrogator, a collocated discrete address beacon system (DABS) transponder and a directional antenna on the protected aircraft. The protected aircraft synchronizes a local clock with the pulse repetition frequency (PRF) and scan rate of the ATCRBS interrogating his field of interest from which information the protected aircraft can calculate the azimuth angle of responding intruder aircraft with respect to the ground station. By means of his directional antenna the protected aircraft also determines the azimuth of the intruder with respect to itself. Interrogation by the protected aircraft of a collocated ground DABS transponder or a DME or other suitable means of measuring range provides a data base which together with the aforementioned azimuth angles permits the protected aircraft to calculate instantaneous position of the intruder relative to his own.

2 Claims, 8 Drawing Figures

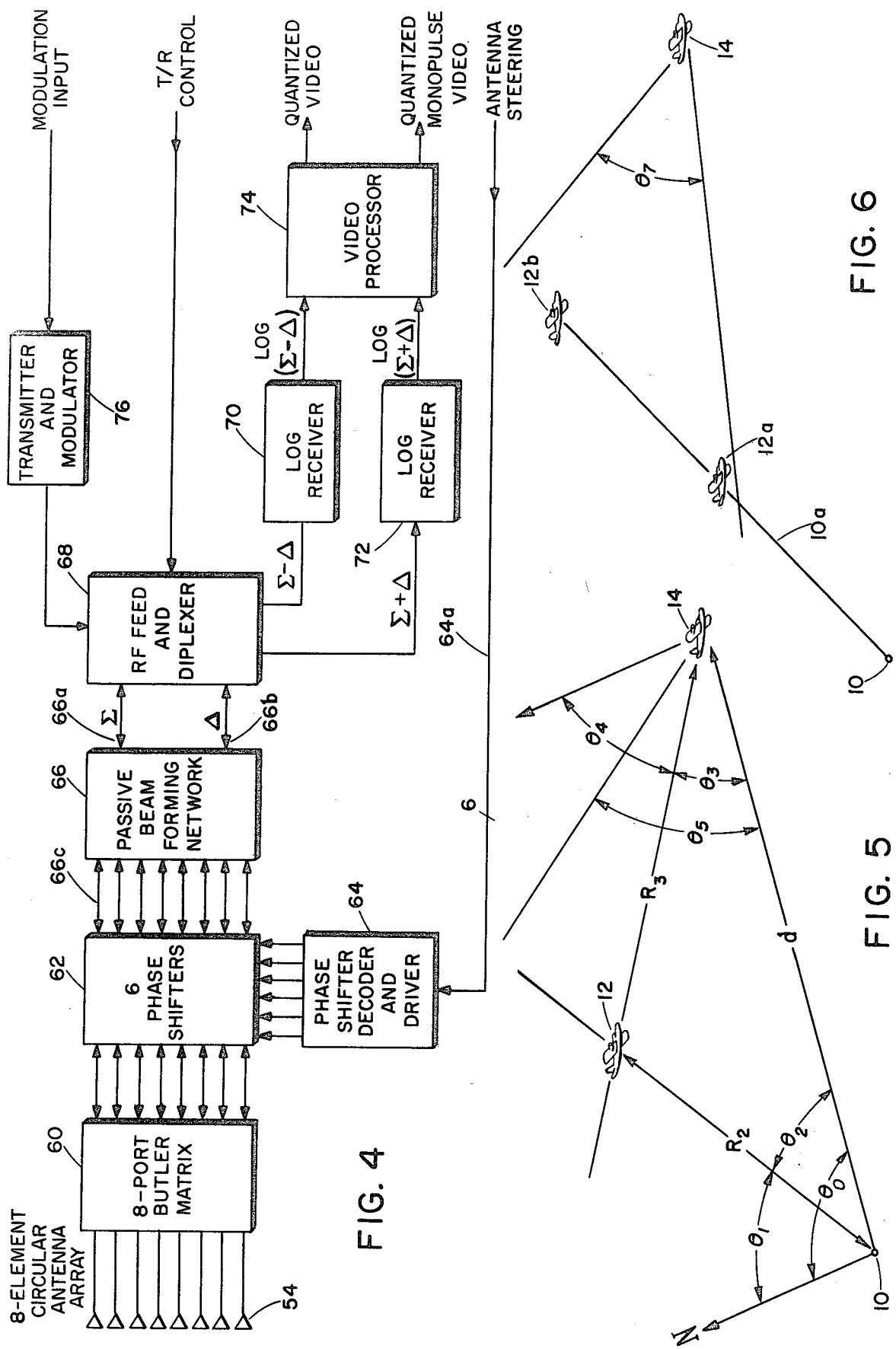

MEANS FOR ACCUMULATING AIRCRAFT POSITION DATA FOR A BEACON BASED COLLISION AVOIDANCE SYSTEM AND OTHER PURPOSES

BACKGROUND OF THE INVENTION

This invention relates to beacon based collision avoidance systems (BCAS) for aircraft and more particularly to such systems which require a minimum of ground sites and whereby data which can be used to calculate collision threat is obtained.

The problem of preventing mid-air collisions of aircraft has long confronted the aircraft industry generally. This problem has recently become more acute with the introduction of relatively large and expensive aircraft each of which is capable of carrying great numbers of passengers. The public has come to expect that the aviation industry provide comprehensive flight services with a high degree of safety and the industry has striven to provide it. It is, however, now recognized that the conventional air traffic control (ATC) system suffers from rather severe limitations with respect to mid-air collision prevention because of the constantly increasing volume of air traffic. Under conventional ATC standards each airborne aircraft under control is assigned an exclusive volume of air space about the aircraft. As the density of traffic increases and air speeds rise, the volume of space that must be assigned to each controlled aircraft must also be increased to provide an adequate margin or periphery of safety about each aircraft, and all aircraft need to be placed under positive control.

There is now considerable interest in techniques for providing aircraft with auxiliary information which will support a back-up to the ATC system so that appropriate collision avoidance maneuvers can be made in the event of ATC system error or malfunction or pilot error and/or to bring aircraft not under positive control into the avoidance system. Various back-up collision avoidance systems have been proposed, one of which, the beacon collision avoidance system (BCAS) is of particular interest at the present time since it affords immediate protection of the BCAS equipped aircraft from all ATCRBS transponder equipped aircraft. The present invention comprises an improvement over other forms of BCAS systems. BCAS is characterized in that each protected aircraft has on-board equipment which considers the responses of intruder aircraft within its field of interest to interrogations from a standard ground air traffic control beacon system interrogator (ATCBI). Where there are two spaced apart ground ATCBI stations interrogating the particulaar field of interest, it has been claimed that the protected aircraft can determine with a relatively high degree of accuracy the position of intruder aircraft with respect to the protected aircraft and thus provide itself with collision avoidance information.

The same basic technique may also be used on the ground to provide passive (non-interrogating) surveillance using the reply signals generated to nearby active interrogators. In this application the amount of interference generated at the beacon frequencies (1030 and 1090 MHz) is held constant permitting an increase in the number of control facilities without increasing interference.

SUMMARY OF THE INVENTION

It is an object of this invention to provide the input data for a beacon collision avoidance system which needs only a single active ground station to provide the same collision avoidance information to a protected aircraft as previously provided to the active ground stations. In accordance with the teachings of this invention, the single ground station is comprised of an ATCRBS interrogator and a collocated discrete address beacon system (DABS) or DME transponder. The ground ATCRBS interrogator operates in the conventional manner, that is, it interrogates the entire field of interest by means of a rotating interrogation beacon, more of which will be described below. As known to those skilled in the art, any ATCRBS transponder equipped aircraft at which the interrogation signal is directed responds with its identification and altitude, depending on the type of interrogation. A DABS transponder, on the other hand, will respond to an interrogation directed thereto only if the interrogation message includes as a part thereof the address code of the particular transponder.

There will be described below that a protected aircraft includes means for addressing ground based DABS or DME transponders and for receiving responses therefrom. It also includes a standard ATCRBS transponder and, additionally local clock means which it synchronizes to the pulse repetition frequency and scan rate of the ground ATCRBS interrogator in its field of interest. The invention also includes means local to the protected aircraft, similar to that found in the prior BCAS art, for listening in to the responses of intruder aircraft in its field of interest to ground ATCRBS interrogations. It will be further described that with the above mentioned equipment the protected aircraft can determine azimuth of an intruder aircraft and itself with respect to the active ground station, the bearing of the intruder aircraft with respect to itself and the slant range between itself and the ground station. Given this information the protected aircraft can calculate the instantaneous slant range to the intruder aircraft. By considering the altitude of the intruder (included in each reply of the intruder aircraft to an interrogation from the ground station of a known, predetermined type) and by plotting its movement with respect to itself, the protected aircraft can develop collision avoidance logic as was done under the prior art.

In a modification of the invention also to be described below it will be shown how a silent station having only an ATCRBS receiver and necessary processing logic, can keep track of transponder equipped aircraft operating within the field of interest of a remote ATCBI ground station interrogator. In this case it is assumed that the silent station knows the range between itself and the active ground station interrogator and the azimuth bearing of that station. The silent station also includes a clock means, similar to that found on the protected aircraft of the first embodiment, which is synchronized with the scan rate and pulse repetition frequency of ATCRBS ground interrogator. By means of directional measurement techniques such as monopulse the silent station can determine the azimuth of a responding aircraft with respect to itself. By consulting its clock means it can establish the azimuth of the responding aircraft with respect to the interrogator. With these angles, and knowing the range and bearing to the interrogator, the silent station can easily calculate the position of the responding aircraft. The second embodiment of the invention is not particular to BCAS purposes but rather is preferably used where it is desired to hinder discovery of the location of the silent station or to minimize beacon interference. For example, the second embodiment is adapted to be used as a passive IFF surveillance station which, if discovered, might be subject to attack by an enemy. It is thus another object of this invention to provide a passive surveillance system operating within an interrogator-transponder field of interest. These and other objects of the invention will become apparent to one skilled in the art with a reading and understanding of the following description of the various embodiments of the invention and the appended claims.

BRIEF DESCRIPTION OF THE DRAWINGS

FIG. 4 is a block diagram of the steering means of the antenna of FIG. 3.

FIG. 5 illustrates the geometry of one way in which the protected aircraft searches through a field of interest for intruders.

FIG. 6 illustrates the geometry of two intruder aircraft lying on the same ground station radial such that reply garble is present at the protected aircraft and is helpful in showing how the garble can be eliminated by use of the invention.

DESCRIPTION OF THE PREFERRED EMBODIMENT

Figure 1:
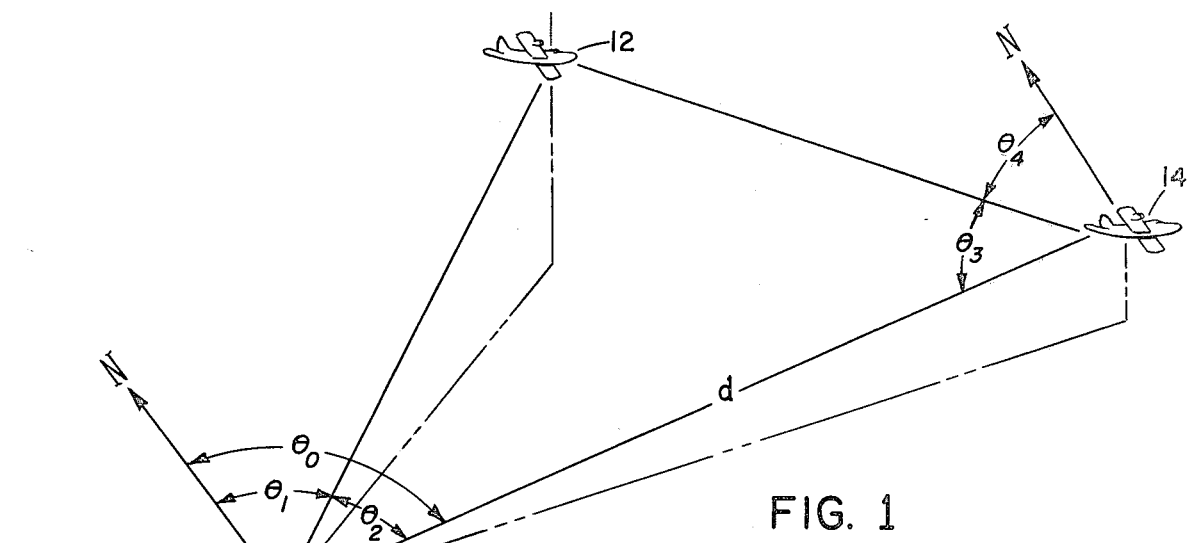
FIG. 1 shows a protected aircraft and an intruder aircraft in the field of interest of a ground station and the geometric relationships therebetween comprising a navigational triangle.

Referring to FIG. 1 there is seen at a ground location a ground station represented at 10 and at which is sited an ATCRBS interrogator (ATCBI) and a DABS, DME or other distance determining transponder means. An exemplary north pointing arrow is shown for orientation. An intruder aircraft 12 and a protected aircraft 14 are shown flying within the field of interest of station 10. By field of interest is meant that volume of space wherein transponders and interrogators cooperate in the conventional manner. It is assumed that intruder 12 includes at least an ATCRBS transponder and protected aircraft 14 includes at least an ATCRBS transponder and an appropriate interrogator such as a DABS or DME interrogator.

As is also conventional, the ATCRBS interrogator is assumed to sweep an interrogation signal in a relatively narrow vertically oriented fan-shaped beam through the field of interest, with ground station 10 as a pivot, at a constant rate. It is also assumed that, as is conventional, ground station 10 generates standard ATCRBS interrogation messages at a constant rate or in a known or discoverable temporal pattern so that all ATCRBS transponders within the field of interest are interrogated (and respond) during each revolution of the aforementioned narrow beam.

Figure 2:
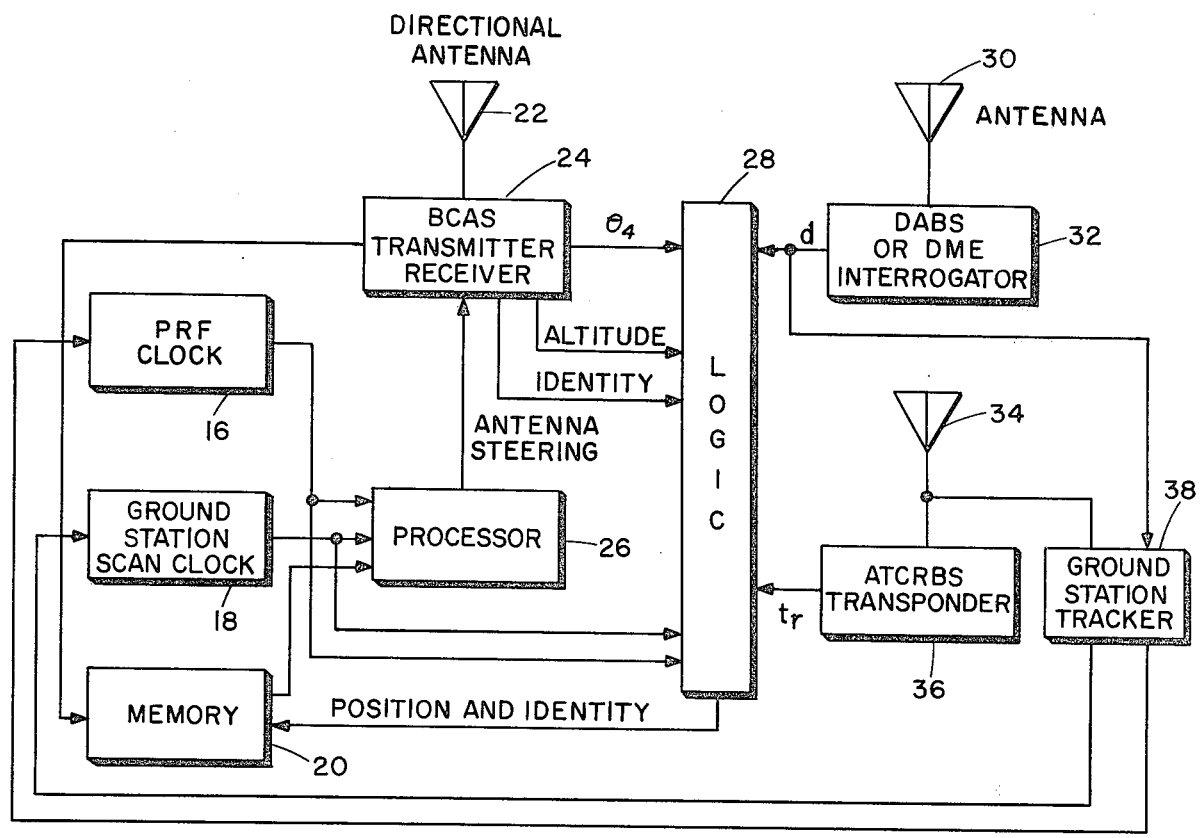
FIG. 2 is a block diagram of the data collecting means found on a protected aircraft.

Protected aircraft 14, by interrogating the ground station DABS or DME transponder with its interrogator can measure the slant range, d, therebetween as known to those skilled in the art. The interrogator 32 is seen in the block diagram of FIG. 2 which comprises the elements of the CAS data collecting means installed on protected aircraft 14. Reference to this figure should now be made. As shown interrogator 32 includes an antenna 30 and the conventional circuits to interrogate the ground located transponder, in this case the transponder at site 10 of FIG. 1. As known to those skilled in the art, the conventional DABS or DME system such as shown at FIG. 2 provides a measure of slant range, d, between itself and the responding transponder by measurement of the message round trip transit time. Of course, interrogator 32 is set to interrogate, by specific address, the desired responding transponder. Means for providing this address to the interrogator are known to those skilled in the art and, not comprising an essential part of the invention, need not be described here. Slant range d is entered into logic circuit 28 and becomes one factor in the solution of the navigational triangle of FIG. 1.

Preferably a standard ATCRBS or DABS transponder 36 having antenna 34 responds to interrogations from ground station 10 of FIG. 1 and permits its azimuth angle $\theta_o$ with respect to the ground station to be determined whenever it transmits a reply at time $t_r$. A signal at time $t_r$ applied to logic circuit 28 permits $\theta_o$ to be entered therein, suitably from clock 18. In addition, a ground station tracker 38 keeps track of interrogations from the ground station received on antenna 34. In particular, tracker 38 determines the ground station PRF and azimuth scan rate of the ground station scanning beam, noting also the north or other identifiable position of the ground station scanning beam. Various means for identifying the position of the ground station scanning beam are known to those skilled in the art. For example, in some systems an omnidirectional marker, normally noting the instantaneous north position of the scanning beam, is transmitted. An alternative scheme is to squitter the DABS or DME ground equipment, as appropriate, with a code identifying the instantaneous position of the scanning beam. In any event, the specific means employed is not as essential part of the present invention, it only being necessary that the position of the scanning beam be known when appropriate as should become clear as this description proceeds. With this information tracker 38 synchronizes PRF clock 16 and ground station scan clock with the ground station PRF and scanning beam information.

The protected aircraft also includes a BCAS transmitter-receiver 24 having a steerable directional antenna 22. More below will be said of steerable directional antenna 22; however, it should be stated now that antenna 22 has the ability to not only direct an interrogation into a selected or otherwise predetermined direction but is also able to determine the direction from which a reply message is received. In effect, antenna 22 and receiver 24 listen in to ATCRBS responses from intruder aircraft made in response to interrogations from station 10. In accordance with steering directions received from processor 26, antenna 22 and receiver 24 determine the direction from which these responses emanate.

Since antenna 22 is directional, receiver 24 determines azimuth, $\theta_4$, of the responding intruder with respect to itself and enters this angle into logic circuit 28. In addition, upon receiving a response from an intruder aircraft, receiver 24 causes the azimuth angle $\theta_1$ of the intruder aircraft with respect to the ground station to be entered from ground station scan clock 18 into logic circuit 28. It will be remembered that clock 18 has been synchronized with the ATCRBS ground station scan and hence comprises a measure of $\theta_1$ when the intruder responds to an ATCRBS ground station interrogation. Logic circuit 28 now has sufficient information to solve the navigation triangle defined by points 10, 12 and 14 of FIG. 1. Specifically, $$\theta_2 = \theta_o - \theta_1$$

$$\theta_3 = 180° - \theta_o - \theta_4$$

with the included side d being determined directly from DABS or DME interrogator 32 as previously mentioned. Logic circuit 28 can thus determine the position of the responding intruder with respect to ground station 10 and with respect to itself, the latter locational information being preferred. In addition, as known to those skilled in the transponder arts, intruder 12 has responded with both its altitude and identity encoded in its response, this information being included at various times in response to the particular interrogation message from station 10. Logic circuit 28 thus can locate intruder 12 in three dimensional space and in addition can identify the intruder. Given the inputs shown for logic circuit 28 and the desired function thereof the means for implementing the circuit should be obvious to one skilled in the art and need not be discussed here. It is sufficient to state that the position and identity information from logic circuit 28 is entered into a memory 20. The positional information is fed back to processor 26 which also receives information as to the ground station 10 interrogation beam from PRF clock 16 and ground station scan clock 18 and can thus predict the time of and direction from which the next ATCRBS response from intruder 12 will be received. In other words, processor 26 is now able to formulate antenna steering instructions for receiver 24 and antenna 22 thus completing the loop.

It is common knowledge that an ATCRBS interrogator such as included in ground station 10 radiates a fan-shaped interrogation beam. The beam is rotated, usually at a constant rotational rate, and can be modified easily to transmit a "north" or other directional marker as previously discussed. The interrogation message is such that transponders located within the interrogation beam respond with altitude or identity information, depending upon the specific interrogation message, while transponders outside the beam are temporarily suppressed. An interrogated transponder is also temporarily suppressed immediately after it transmits its reply to alleviate multipath reflection so that it responds to a given interrogator generally, only once during each PRF when it is within the beam. Special logic is used to keep account of replies to the ground station interrogation beam and to center mark the series with the true azimuth. In the present embodiment a ground station tracker 38 receives all the interrogation messages (hereafter termed PRF's) from the ground station during the time that antenna 34 is illuminated thereby, that is, as the ground station interrogation beam sweeps thereover. In addition, it receives the standard omnidirectional side-lobe suppression (SLS) pulses transmitted by the standard ATCRBS ground station with each PRF. Since these PRF's occur at known intervals, for example, every 2.5 milliseconds, it is easy to maintain a clock such as PRF clock 16 synchronized to the ground station PRF. Time of transmission between the ground station and the protected aircraft is provided for by the slant range d received from DABS interrogator 32 so that PRF clock 16 can accurately predict, in real time, when ground station 10 will transmit an interrogation message.

In like manner, tracker 38 notes the specially provided ground station beacon "north" markers and synchronizes clock 18 thereto, again compensating for transmission time with slant range information from DABS or DME interrogator 32. Thus, clock 18 accurately predicts the azimuth at which each ground station PRF is transmitted. Clocks such as PRF clock 16 and ground station scan clock 18 and means such as tracker 38 for synchronizing them to external periodic signals are well known to those skilled in the art. For example, U.S. Pat. No. 3,798,650 teaches means for synchronizing local clocks to remote clocks over a space link. In the present case, the remote clocks comprise the ground station scan and PRF's. U.S. Pat. No. 3,723,714 teaches means locking the phase of a local clock to a remote clock via a space link. In any event, the specific clocks and tracker of the present description do not comprise, in themselves, inventions of this embodiment.

Figure 3:
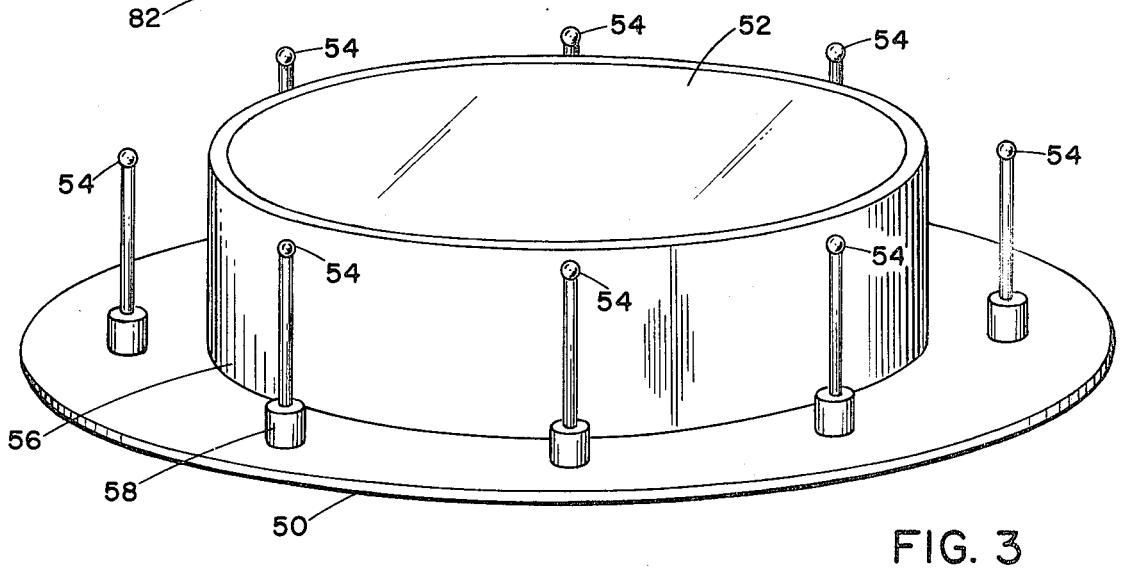
FIG. 3 is an oblique view of the upper surface of one form of a typical directional antenna suitable for use in the invention.

Directional antenna 22 is of the general type described in the article "Bendix Flight-Tests a Listen-In PWI" which appeared starting at page 90 of the Sept. 25, 1972 edition of Aviation Week and Space Technology. FIG. 3 shows one form of a directional antenna suitable for use in the invention. Referring to that figure the antenna is comprised of a flat disc 50 and a hat-shaped center section 52 which suitably has contained therein the antenna module circuits which will be described in detail below. Mounted in a circular pattern on disc 50 are eight equally spaced monopoles 54. The upstanding portion 56 of hat-shaped section 52 comprises a reflector for each monopole. Electrical connection between the monopoles, which are d.c. isolated from disc 50 by means of dielectric cylinders 58 and the antenna module circuits is not shown but is along the underside of disc 50. In use it is intended that the antenna be mounted to the skin of the aircraft with the underside of disc 50 mated to the skin and the monopoles 54 vertical when the aircraft is in level flight. It is also desirable that two antennas such as that shown in FIG. 3 be installed on the aircraft, one on its top surface and one on its belly, to be time shared with the CAS transmitter-receiver 24 of FIG. 2 so as to cover as completely as possible all the airspace about the protected aircraft.

Refer now to FIG. 4 which is block diagram of the directional antenna of FIG. 3 and the antenna module circuits. Monopoles 54, originally seen in FIG. 3, are shown connected individually into an eight port Butler matrix, which as known to those skilled in the art, is a beam forming element. Such a matrix is shown in detail at page 11–66 of the Radar Handbook, edited by M. I. Skolnik and published in 1970 by the McGraw-Hill Book Company.

The antenna is steered, in this embodiment, by a six bit binary number or steering command received on lines 64a and delivered to the phase shifter decoder and drivers 64. As will become clear, the use of a six bit steering command allows the circular antenna array to direct a directional beam onto any one of 64 equally spaced azimuth positions. Phase shifter decoder and drivers 64 simply decodes the six bit steering command for use by a conventional six bit phase shifter 62, suitably of the diode phase shifter type.

Although an 8-port Butler matrix is used, only 6 variably phase shifted signals are applied thereto from phase shifters 62. A seventh input port is referenced to a fixed phase and an eighth port absorbs any out of balance signals as known to those skilled in the art.

A passive beam forming network 66 is connected to phase shifter 62. Network 66 is simply a tree of directional couplers which receives power from ports such as 66a and 66b and distributes it to ports 66c equally divided and coherent with each other when the device is used as a transmitting antenna, or receives power at ports 66c and delivers it to ports 66a and 66b when used as a receiving antenna.

An RF feed and diplexer circuit 68 obtains sum and difference signals from network 66, when in the receiver mode, and delivers the sum less difference and the sum plus difference signals through logarithmic receivers 70 and 72, respectively, to video processor 74 which, in the conventional manner, provides quantized video and quantized monopulse video data. When in a transmit mode modulation is provided by transmitter/modulator 76. Transmit or receive modes are selected in accordance with a transmit/receive (T/R) control signal.

In the present embodiment the antenna of FIG. 4 is operated in a passive or receive mode. However, in an alternate embodiment of the invention to be described it is also operated in an active or transmit mode.

Referring again to FIG. 2, the invention, in operation and assuming the protected aircraft first enters a field interrogated by a ground station, the ground station interrogations are monitored by ground station tracker 38 to synchronize clocks 16 and 18 with the ground station. In addition, of course, ATCRBS transponder 36 responds to interrogations received. At the same time CAS receiver 24 and directional antenna 22 search the field of interest for intruders, preferably as illustrated by FIG. 5, reference to which should also be made. By means of his DABS or DME interrogator 32 (of FIG. 2) protected aircraft 14 determines his slant range d to ground station 10. By considering the ATCRBS interrogations directed toward himself the protected aircraft determines the azimuth $\theta_o$ of himself with respect to ground station 10. By constantly examining clocks 16 and 18 of FIG. 2 the protected aircraft predicts the ground station interrogation beam pointing angle $\theta_1$ and the time at which an interrogation emanates therefrom. With this information antenna steering processor 26 can determine the direction from which an intruder response can be expected and the time the response, if any, will be heard at the protected aircraft. Accordingly, processor 26 directs receiver 24 and direction antenna 22 to sweep at the proper rate in a receive mode from ground station 10 (corresponding to zero range from the ground station to the intruder) to some suitable maximum angle $\theta_5$, for example. Upon hearing a response, such as from intruder 12, $\theta_4$ becomes known to a close tolerance. Of course, angles $\theta_2$ and $\theta_3$ also can be calculated as before thus permitting the navigational triangle including range $R_3$ between the intruder and protected aircrafts to be estimated. Also, the identity and altitude of the intruder become known, depending on the type of interrogation. The position, identity and altitude of the intruder are entered into memory 20. In this manner the entire field of interest can be periodically searched and intruder aircraft enrolled in memory 20. Subsequently, processor 26 having inputs from memory 20 and logic circuit 28 will track those intruders which constitute a potential collision threat.

Refer now to FIG. 6 where two intruder aircraft 12a and 12b lie on the same radial 10a from ground station 10 so that both are interrogated by the same ground station interrogation. In this case it is possible that the responses from the two intruders may overlap as received at protected aircraft 14, a condition normally termed synchronous garble. This is a situation that occurs most often in crowded airspace. To alleviate this problem the protected aircraft switches its transmitter-receiver 24 and directional antenna 22 to an active or transmit mode and sweeps a standard ATCRBS interrogation message through the angle $\theta_7$, which angle includes all garbling intruders. It should be obvious that the angle $\theta_7$ can be calculated by considering the beginning and end of the garbled responses to the ground station interrogations. Alternatively in updating tracks already acquired the system would transmit a single interrogation to the predicted location of each aircraft being tracked. It should also be obvious that by this means the angles and the slant ranges between the intruders and the protected aircraft are directly obtained thus providing sufficient input data for logic circuit 28 to solve the navigational triangles which include the various intruders. As before, the position and identity of the intruders is entered into memory 20.

Having identified and positioned the intruders in memory 20 it should be clear that subsequent enrollments will permit some means (not shown) to determine when an intruder becomes such a collision threat that evasive maneuvers must be performed. Such means do not comprise a part of this invention; however, this art is well developed at the present time and various such means will suggest themselves to one skilled in the art.

Figure 7:
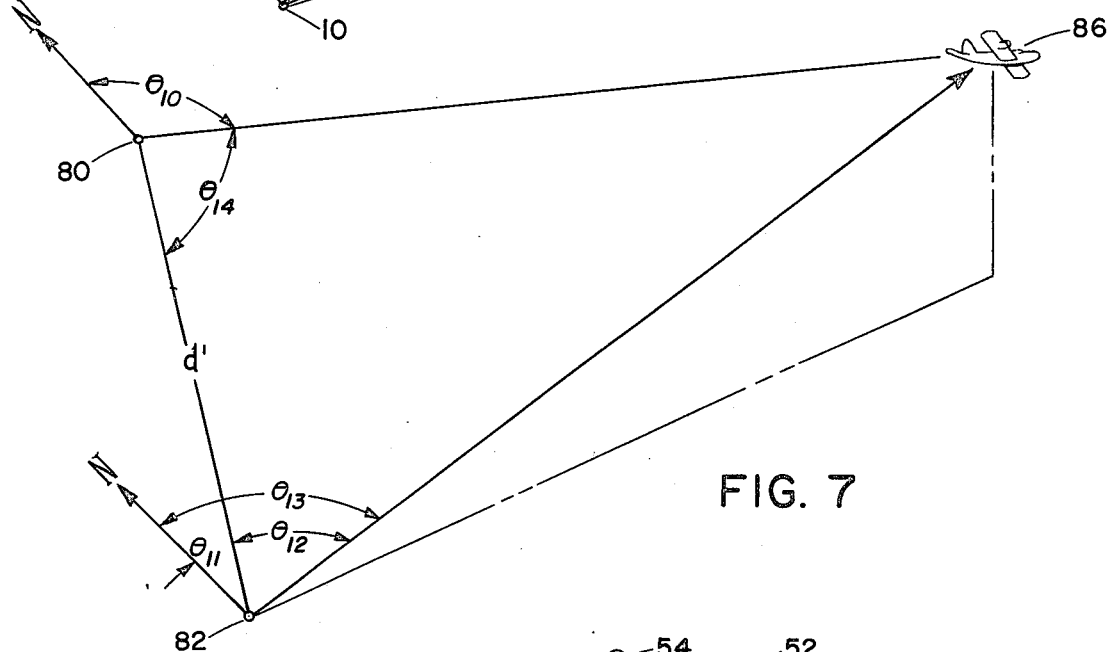
FIG. 7 illustrates the geometry of an aircraft operating in the field of interest of an active interrogator and a passive surveillance site and is helpful in explaining another embodiment of the invention.
Figure 8:
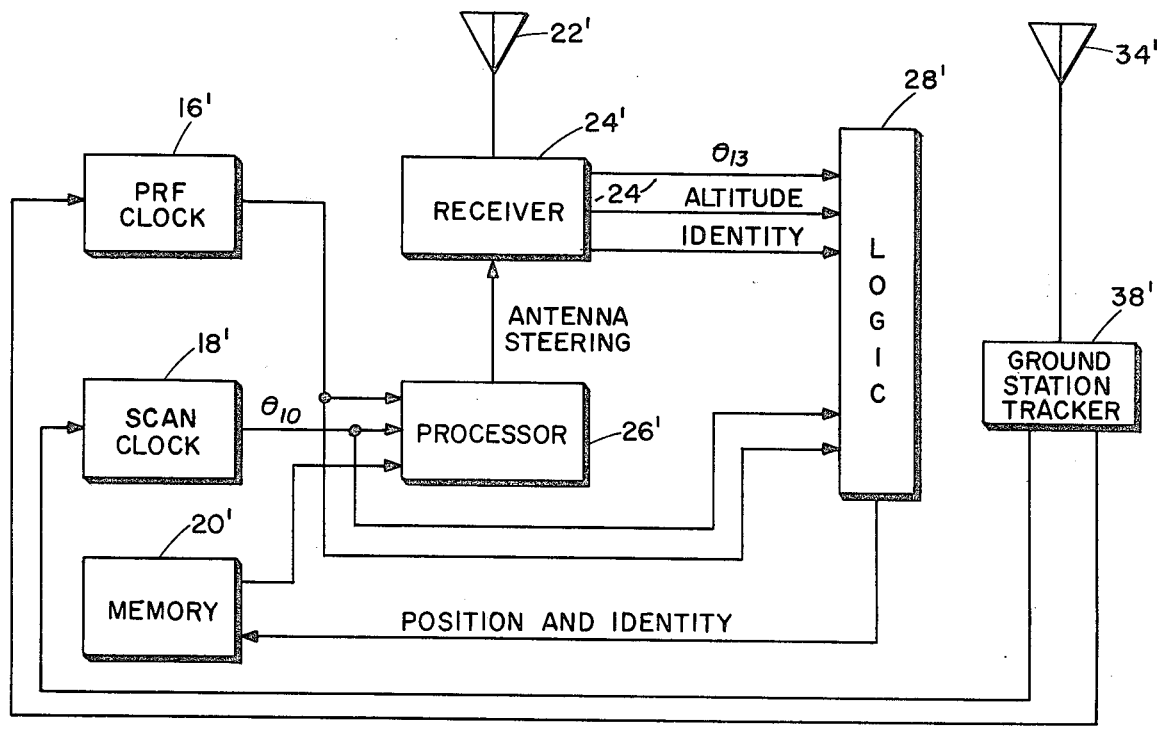
FIG. 8 is a block diagram of another embodiment of the invention.

FIG. 7 is helpful in describing a slightly different form of the invention and reference should now be made thereto. Illustrated is an aircraft 86 having at least a transponder such as an ATCRBS transponder, an active interrogator 80 such as an IFF (Identification friend or foe) or ATCRBI and a passive surveillance site 82 having thereat the elements generally shown at FIG. 2 except there need not be provided, under certain circumstances, interrogator 32 and its antenna 30 nor ATCRBS transponder 36. It should be understood that the embodiment now being described basically places the elements shown as being in the protected aircraft of the previous embodiment now at ground site 82. Such an arrangement can be useful where, for example, site 82 is a military base at which it is necessary to have airspace surveillance available but at which it is undesirable to be actively transmitting interrogations. In this case interrogations are transmitted from the spaced apart interrogator 80. Suitably, the distance d' between sites 80 and 82 is known as well as the azimuth angle $\theta_{11}$ of site 80 with respect to site 82. FIG. 8, reference to which should now also be made, shows the generally essential elements at site 82. As mentioned earlier, these elements are similar or identical to like elements of FIG. 2 and the functions thereof are also similar or identical. Assuming d' and $\theta_{11}$ to be known and contained in logic circuit 28', ground station tracker 38' with antenna 34' monitors the PRF's from the interrogator at site 80 to synchronize PRF clock 16' and scan clock 18'.

Having an understanding of the workings of the elements of FIG. 2 it should be obvious how the elements of FIG. 8 permit the navigational triangle of FIG. 7 to be solved. Specifically, receiver 24' and directional antenna 22' permit the identity and altitude of aircraft together with angle $\theta_{13}$ to be entered into logic circuit 28'. With angle $\theta_{11}$ known the logic circuit can calculate angle $\theta_{12}$. Logic circuit 28' also receives angle $\theta_{10}$ from scan clock 18', this information being entered upon receipt at site 82 of the response of aircraft 86. Of course, the time of flight of the various signals can be compensated once the various sides of the navigational triangle become initially calculated. Logic circuit 28' now enters the position and identity of the aircraft into memory 20' which, as in the embodiment of FIG. 2, instructs processor 26' on how to steer antenna 22' so as to track the aircraft. Of course, if distance d' and angle $\theta_{11}$ are not known by the siting of sites 80 and 82 then the use of DABS or DME interrogator, such as interrogator 32 of FIG. 2 at site 82 and an appropriate transponder at site 80 will provide distance d and ground station tracker 38' will permit angle $\theta_{11}$ to be obtained as in the earlier embodiment.

From the above description it should now be obvious how the system of FIG. 8 can search the field of interest to discover aircraft not enrolled in memory 20'.

Having described various embodiments of the invention certain other alterations and modifications thereof will now suggest themselves to one skilled in the art. For example, the aforementioned, but not shown, means for determining when the data provided by the elements of the invention indicate a dangerous and potential collision situation is arising, that means can instruct element 24 of FIG. 2 to beam interrogations directly to the threatening intruder so as to provide updated data at a higher information rate. Also, when the protected aircraft is operating out of the field of interest of any ground station it can interrogate its own field of interest by means of transmitter-receiver 24 and directional antenna 22 to provide intruder position data. Accordingly, the property claimed is to be limited by the true scope and spirit of the appended claims.

The invention claimed is:

1. Means for use in a beacon based collision avoidance system wherein a fixed station transmits an interrogation message along a relatively narrow beam radiated from the fixed station and wherein said relatively narrow beam is scanned through a field of interest on a discoverable schedule and wherein an aircraft illuminated by said beam normally transponds a first reply message said means for use comprising:

an addressable transponder for transmitting a second reply message when addressed, said addressable transponder being arranged in predetermined fixed spatial relationship with said fixed station; and, a protected aircraft comprising:

means for discovering said schedule;

means for transponding a reply message when said protected aircraft is illuminated by said relatively narrow beam;

an interrogator for addressing a message to said addressable transponder whereby said addressable transponder transmits said second reply message, the range between said protected aircraft and said addressable transponder being determined thereby; and, a directionable antenna means responsive to said range and said schedule for steering a beam therefrom.

2. The means for use in a beacon based collision avoidance system of claim 1 wherein said means for discovering comprises means for receiving interrogations from said fixed station and clock means responsive to the received interrogations from said fixed station to synchronize said clock means with said interrogations.

* * * * *